J. W. SCHROEDER.
FASTENING FOR WAGON END GATES.
APPLICATION FILED OCT. 28, 1911.
1,040,779.
Patented Oct. 8, 1912.
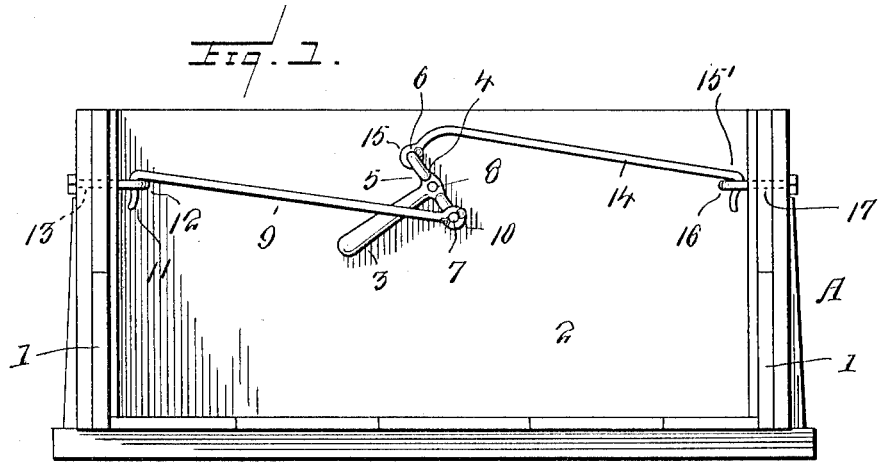
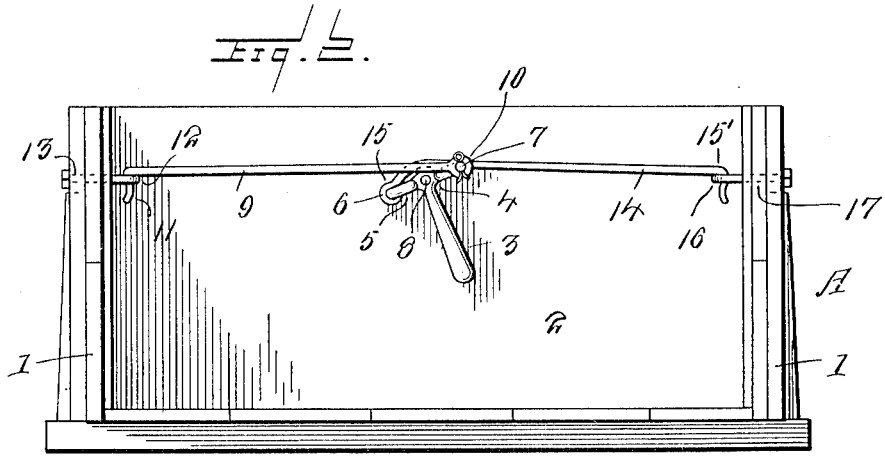
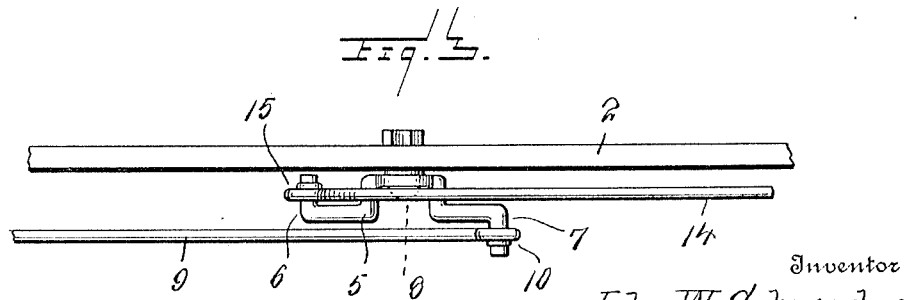
Inventor
John W. Schroeder
By Victor J. Evans
Attorney
Witnesses

UNITED STATES PATENT OFFICE.

JOHN W. SCHROEDER, OF FREEMAN, SOUTH DAKOTA.

FASTENING FOR WAGON END-GATES.

1,040,779. Specification of Letters Patent. Patented Oct. 8, 1912.

Application filed October 28, 1911. Serial No. 657,236.

*To all whom it may concern:*

Be it known that I, JOHN W. SCHROEDER, a citizen of the United States, residing at Freeman, in the county of Hutchinson and State of South Dakota, have invented new and useful Improvements in Fastenings for Wagon End-Gates, of which the following is a specification.

This invention relates to certain novel and useful improvements in a lock or fastening device for the end gates of wagons.

In carrying out my invention, it is my purpose to provide a locking or fastening device, whereby the end board or gate may be quickly, rapidly and securely fastened in position by the simple actuation of a lever connected with the locking members.

Furthermore, I aim to provide a device which may be attached to any ordinary form of end gate and which will embody in its construction the desired features of simplicity, strength, durability and convenience.

With the above-recited objects, and others of a similar nature in view, the invention consists in the construction, combination and arrangement of parts, set forth in and falling within the scope of the appended claims.

In the drawings:—Figure 1 is a view in elevation of a rear end of a wagon box, showing my invention applied thereto in unlocked position. Fig. 2 is a similar view, showing the invention in locking relation to the end gate. Fig. 3 is a top plan view.

Referring now to the accompanying drawings in detail, the letter A indicates a box-like wagon body as an entirety of which the numerals 1—1 indicate the sides thereof, while the end gate is shown at 2, said end gate fitting at the tail of the wagon body in the usual manner.

My improved fastening device comprises in its construction a lever or handle 3 of any suitable form, shape or dimensions, which is fastened as at 4 to the central portion of the crank 5, which is bent into approximately U-shape form. The ends of the crank arms which are indicated at 6 and 7, respectively, are bent in opposite directions. This crank arm with the detachable handle is adapted to be fastened to the end gate through the medium of a pivot bolt 8.

The numeral 9 indicates a metallic rod having one end formed with an eye 10 which is adapted to be pivoted or loosely fastened to the far end 7 of the crank arm. The opposite or outer end of the rod 9 is provided with a hooked member 11 which is adapted to engage with the eye 12 of the eye bolt 13, which latter is fastened in the end of the wagon side. Similarly, I provide a second metallic rod 14 having an eye 15 by means of which the inner end of the rod is adapted to be fastened to the end 6 of the crank arm, said rod then extending across said crank arm outwardly and is provided at its opposite end with a hook 15' adapted to fit in the eye 16 of the eye bolt 17 in the adjacent end of the wagon body.

From the above description, taken in connection with the accompanying drawings, the construction and manner of employing my invention will be readily apparent. Assuming the gate to be unlocked, the device occupies the position shown in Fig. 1. To lock the fastener, the hooked ends are inserted in the eye bolts at the ends of the wagon body and the levers are then swung in position, as shown in Fig. 2, when the rods will be drawn inward toward the center of the wagon body, thereby securely locking the end gate in position.

It will be seen that I have provided an exceedingly simple device, which may be readily attached to any ordinary type of wagon body and one by means of which the tail board or end gate may be securely locked in position.

I claim:—

The combination with a wagon body having an end gate, of a locking device for fastening said end gate to said body, said device comprising a lever, a crank arm consisting of a substantially U-shaped central portion and oppositely extending portions contiguous to said central portion, said crank arm being carried by one end of said lever and extending in a lateral direction thereto, end portions bent at right angles to said oppositely extending portions and in opposite directions therefrom, means for pivoting the said crank arm to the end gate, a plurality of rods, each rod having its inner end connected to one of the end portions of said crank arm and out of direct alinement with the other rod, whereby said lever may be swung to any position, the opposite ends of said rods being formed with hooks, and eye-bolts in opposite sides of the wagon body for the reception of said hooks.

In testimony whereof I affix my signature in presence of two witnesses.

JOHN W. SCHROEDER.

Witnesses:
J. M. WOLLMANN,
WM. SCHROEDER.

Copies of this patent may be obtained for five cents each, by addressing the "Commissioner of Patents, Washington, D. C."